United States Patent [19]

Nayar et al.

[11] Patent Number: 5,802,201

[45] Date of Patent: Sep. 1, 1998

[54] ROBOT SYSTEM WITH VISION APPARATUS AND TRANSPARENT GRIPPERS

[75] Inventors: Shree K. Nayar; Anton Nikolaev, both of New York, N.Y.

[73] Assignee: The Trustees of Columbia University in the City of New York, New York, N.Y.

[21] Appl. No.: 598,378

[22] Filed: Feb. 9, 1996

[51] Int. Cl.[6] .................................................. G06T 5/00
[52] U.S. Cl. ........................ 382/153; 382/106; 395/46; 395/94; 901/47; 901/39
[58] Field of Search ................................ 382/106, 153, 382/154; 395/86, 80, 94; 901/46, 47, 30, 38, 39; 364/478.06; 348/87, 91; 424/941; 249/907

[56] References Cited

U.S. PATENT DOCUMENTS

| | | | |
|---|---|---|---|
| 4,727,471 | 2/1988 | Driels et al. | 364/167 |
| 4,907,169 | 3/1990 | Lovoi | 364/153 |
| 5,297,238 | 3/1994 | Wang et al. | 395/94 |
| 5,577,130 | 11/1996 | Wu | 382/106 |
| 5,608,818 | 3/1997 | Chini | 382/153 |

OTHER PUBLICATIONS

Chapter 15, *Interfacing A Vision System with a Robot* by Ulrech Rembold and Christian Blume, University of Karlsruhe, Karlsruhe, W. German, pp. 262–271.

*Global Calibration of a Robot/Vision System* by G.V.Puskorius and L.A. Feldkamp, Research Staff, Ford Motor Company, Dearborn, MI 48121, pp. 190–195, CH2413–3/87.

*Planning Focus of Attention for Multifingered Hand With Consideration of Time–Varying Aspects*, Computer Vision and Image Understanding, vol. 61, No. 3, May, pp. 445–453, 1995, by Shigeyuki Sakane, Toshiji Kumura, Toru Omata and Tomomasa Sata.

*Primary Examiner*—Leo Boudreau
*Assistant Examiner*—Brian P. Werner
*Attorney, Agent, or Firm*—Brumbaugh, Graves, Donohue & Raymond

[57] ABSTRACT

A robot having a vision system for sensing an image of a manipulated object is described. The system includes a robot with an end effector, a transparent gripper mounted on the end effector, a camera for sensing an image of a manipulated object, and an image processing apparatus for processing sensed image data to correct the image data for optical distortion, such as refraction-induced image shifts. Three dimensional image information may be retrieved by including a light plane source and adapting the image processing apparatus to perform three-dimensional image processing.

20 Claims, 9 Drawing Sheets

ROBOT SYSTEM WITH VISION APPARATUS AND TRANSPARENT GRIPPERS

NOTICE OF GOVERNMENT RIGHTS

The U.S. Government has a paid-up license in this invention and the right in limited circumstances to require the patent owner to license others on reasonable items pursuant to the terms of contract No. IRI-9357594 awarded by the National Science Foundation, and contract No. N00015-951-0601 awarded by Office of Naval Research.

BACKGROUND OF THE INVENTION

1. Field of the Invention

The present invention relates to a robotic system, and more specifically, to a robot system that employs a vision system and transparent grippers for improved manipulation of an object.

2. Description of the Related Art

A robot generally interacts mechanically with the physical world by means of a gripper mounted on its end-effector. The level of task complexity that the robot can handle is determined to a large extent by the capabilities of the gripper system it is equipped with. For this reason, grippers and the process of grasping and manipulating an object have been intensely studied in recent years. This has led to the design and fabrication of a panoply of grippers that range from simple parallel-jaw ones to sophisticated anthropomorphic hands.

While the gripper determines the mechanical dexterity of a robot, sensory feedback determines the level of intelligence a robot can achieve. Vision serves as a powerful component of such a feedback system. It provides a richness of information that can enable a robot to handle uncertainties inherent to a task and react to varying environments.

Robotic vision systems may also involve the automatic generation of 3D object models. In both machine vision as well as computer graphics, there is a tangible need for efficient and robust ways of recovering the 3D geometry of an object from a sample. Current approaches use special purpose scanning devices for measuring 3D shape. However, given that the shapes of objects can be fairly complex, scanning an object in a finite number of poses does not always suffice. Such an approach additionally requires cumbersome registration and calibration procedures followed by the fusion of multiple depth maps.

One commonly encountered problem in a robotic vision system is occlusion of the object being manipulated by the robot due to the robot's gripper. Presently available commercial grippers are made of materials that are opaque. As a result, a robot vision system has no way of observing an object in its entirety, while it is being manipulated or even simply held by the gripper. Such occlusion limits the perceptual capabilities of the robot system and, accordingly, the utility of such a system. Occlusion also prevents the generation of three-dimensional object models where the shape of the manipulated object is complex.

There have been several attempts to overcome the problem of visual occlusion caused by the robot's gripper. In Shigeyuki Sakane et al., *Planning Focus of Attention for Multifingered hand with Consideration of Time-Varying Aspects*, 61 Computer Vision & Image Understanding 445 (1995), the author discloses a planning method for overcoming the problem of occlusion caused by the fingers of a robotic hand in a visual monitoring system. The planning method is based on a three-dimensional computer aided design ("CAD") model of the environment, and employs a genetic algorithm to cope with the combinational explosion of image features considered during the monitoring task. The planning method thus enables the robotic hand to handle objects even when an uncertainty exists due to object occlusion.

U.S. Pat. No. 4,727,471, issued to Driels et al. discloses a robotic vision system used in conjunction with a robotic manipulator. The vision system is based on the identification of at least two identifiable features on a manipulated object. The vision system records images of the features in two different orientations in order to determine the location of the features, and determines the position of the manipulated object throughout manipulation by viewing the features. The patent also discloses a stereo triangulation procedure to retrieve three-dimensional information about the position of the object.

U.S. Pat. No. 4,907,169, issued to Lovoi, is similar to the Driels et al. patent and also discloses a robotic vision system used in conjunction with a robotic manipulator that is based on the tracking of an object feature. In the event that a feature is lost, the Lovoi vision system performs a recovery search to relocate the feature. The patent likewise discloses a vision system for gathering three-dimensional information about the manipulated object.

The above-mentioned prior art techniques fail to bridge the gap between the necessary but occlusive grippers and the robotic vision system, as the described vision systems do not obtain a full view of the object during object manipulation. Indeed, the techniques are based on the assumption that a certain amount of uncertainty will exist due to object occlusion caused by opaque grippers. Further, for objects of complex shapes, accurate generation of three-dimensional object models would be difficult, if not impossible.

SUMMARY OF THE INVENTION

An object of the present invention is to present techniques for overcoming the problem of visual occlusion caused by a robot's grippers in a robotic vision system.

A further object of the present invention is to present a robotic vision apparatus where the robot's grippers are made from a transparent material having a low refractive index, minimal optical distortion (i.e., lens effect), and a small dispersion property.

An additional object of the present invention is to present a flexible and fully automated technique for recovering complete object geometry.

A still further object of the present invention is to provide processing equipment to perform a correction operation for refraction induced shifts in a sensed image of an object.

Yet another object of the present invention is to provide processing equipment which enables three-dimensional shape recovery of a sensed image of an object.

In order to meet these and other objects which will become apparent with reference to further disclosure set forth below, the present invention provides a robot for manipulating an object held by a transparent gripper connected to a supporting base which preferably is an end effector of a robot having five or more degrees of freedom. The robot also includes an optical sensor, optically coupled to the transparent gripper, to sense an image of the manipulated object with or without optical distortion due to the transparent gripper, and to convert the sensed image into sensed image data. An image data processing apparatus, designed to process the sensed image data to remove any optical distortion introduced by the gripper, is coupled to the sensor and to the transparent gripper.

In one embodiment, the transparent gripper is a parallel jaw gripper. One or both of the parallel jaws of the gripper may be bearing mounted, so as to be capable of translational movement with respect to the other parallel jaw. With a parallel jaw gripper, the optical sensor may be connected directly to an outer face of one of the parallel jaws.

The transparent gripper is preferably made from a substantially transparent plastic material, such as polymethyl methacrylate. In one embodiment, the sensor is a charged coupled device sensor.

The image data processing apparatus, which may be a general purpose computer, is designed to remove optical distortion caused by refraction of light passing through the transparent gripper. The image data processing apparatus can be adapted to perform transformation processing prior to performing optical distortion processing, so that the sensed image data is transformed from data corresponding to the optical sensor frame of reference to data corresponding to a world frame of reference.

In a preferred embodiment, the robot also includes a light plane source, optically coupled to both the transparent gripper and to the optical sensor, for illuminating the manipulated object with a plane of light. In this embodiment, the image data processing apparatus is further adapted to perform three-dimensional image processing to retrieve three-dimensional information for the manipulated object. In this embodiment, derived three-dimensional information for the manipulated object may be stored in memory as a depth map.

In an alternative arrangement, three dimensional information is generated by employing a sensor arrangement adapted to sense two or more images of the manipulated object. In this arrangement, the image processing apparatus is adapted to perform three-dimensional image processing.

The present invention also provides a method for manipulating an object by a robot, comprising the steps of (a) gripping the manipulated object with a transparent gripper, (b) sensing an image of the manipulated object, with or without optical distortion caused by the transparent gripper, (c) converting the sensed image into sensed image data, and (d) processing the sensed image data to remove any optical distortion introduced by the gripper, in order to generate substantially undistorted image data for the object being manipulated.

The method may also include illuminating the manipulated object with a plane of light prior to sensing the image, where the sensing step senses an image of the illuminated manipulated object, and the image processing step further performs three-dimensional image processing so as to retrieve three-dimensional information for the manipulated object. In an alternative technique, two or more images of the manipulated object are sensed, and the image processing step performs three-dimensional image processing so as to retrieve three-dimensional information for the manipulated object.

The present invention enables a vision sensor to see through a gripper to the object it holds and manipulates. As a result, its visual attributes are visible to external sensors. This allows such vision sensors to monitor an assembly or manipulation task while it is in progress, which enhances the perceptual capabilities of the robot system and hence impact its ability to recover gracefully from errors.

The present invention also provides a flexible and fully automated way of recovering complete object geometry. The gripper can grasp an object just once and present it to a depth measurement system in any number of poses. Since end-effector transformations between consecutive poses are precisely known, the multiple depth maps are easily fused to obtain a complete model of the object.

The accompanying drawings, which are incorporated and constitute part of this disclosure, illustrate a preferred embodiment of the invention and serve to explain the principles of the invention.

BRIEF DESCRIPTION OF THE DRAWINGS

FIGS. 1b and 1c are isometric views of the robot of FIG. 1 and of its end piece, respectively, illustrating six degrees of freedom for the robot shown in FIG. 1a;

DESCRIPTION OF THE PREFERRED EMBODIMENTS

Figure 1A:
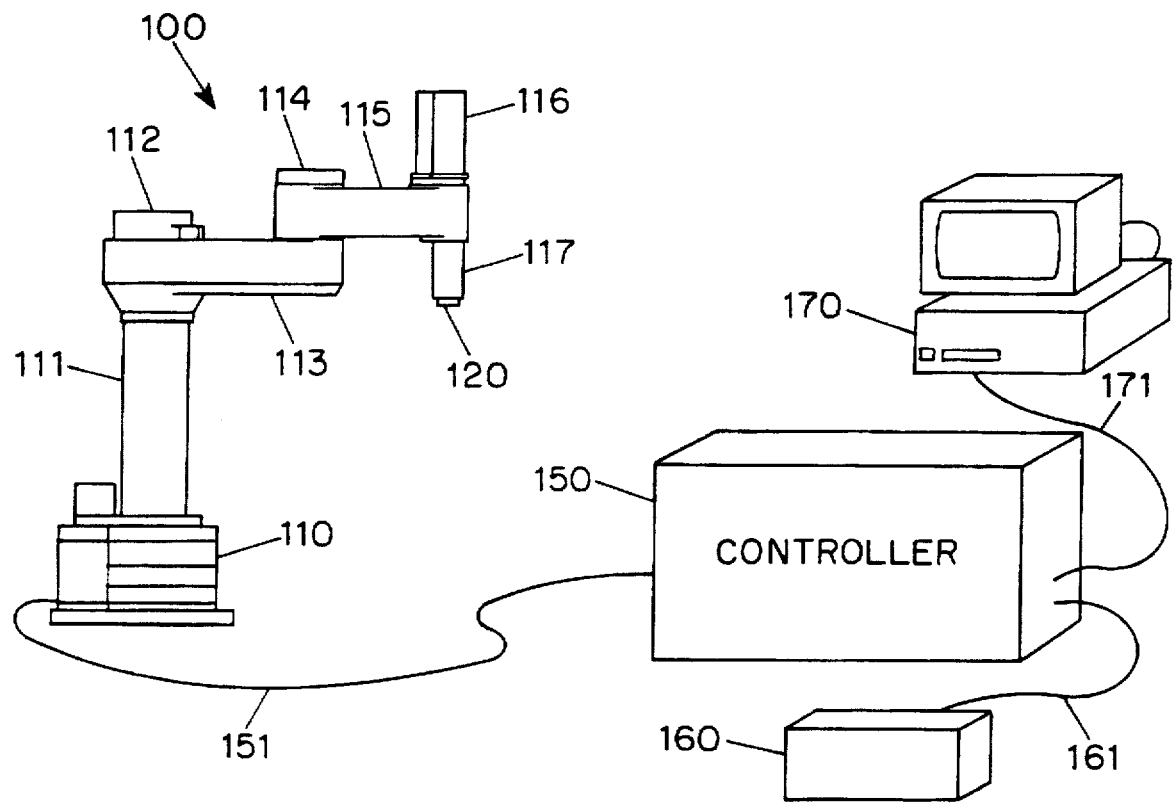
FIG. 1a is a side view and illustrative diagram depicting a typical robot.

Referring to FIG. 1a, there is shown a commercial robot and associated controller which is suitable for use in one embodiment of the present invention. The robot is a commercially available AdeptOne Robot, manufactured by Adept Technology Inc. The AdeptOne Robot 100 includes a controller 150 connected to the base 110 of the robot by cable 151, and a console 160 connected via cable 161. The controller may also be connected to a general purpose computer 170, such as a DEC Alpha 3000/600 workstation, connected by cable 171 which acts as an input to control the movement of the robot. The console 160 enables a user to manually move the robot 100 in various ways, as discussed below.

Figure 1B:
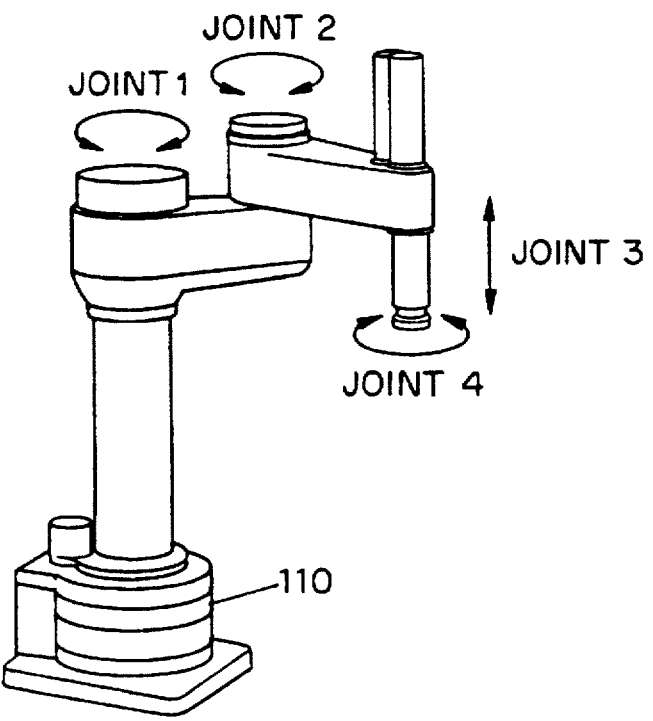

The Robot 100 include a base 110, vertical column 111, inner link 113, outer link 115, vertical column 117, quill cover 116, and end piece 120. Vertical column 111 is connected to inner link 113 by way of a joint 112 that permits rotational movement thereabout, as illustrated by the denomination Joint1 in FIG. 1b. Likewise, inner link 113 is connected to outer link 115 by way of joint 114 that permits rotational movement thereabout, as illustrated by the denomination Joint2 in FIG. 1b. Column 117 is connected to outer link 115 so that it may move both translationally and rotationally with respect to outer link 115, as illustrated by the denominations Joint 3 and Joint4 in FIG. 1b.

Figure 1C:
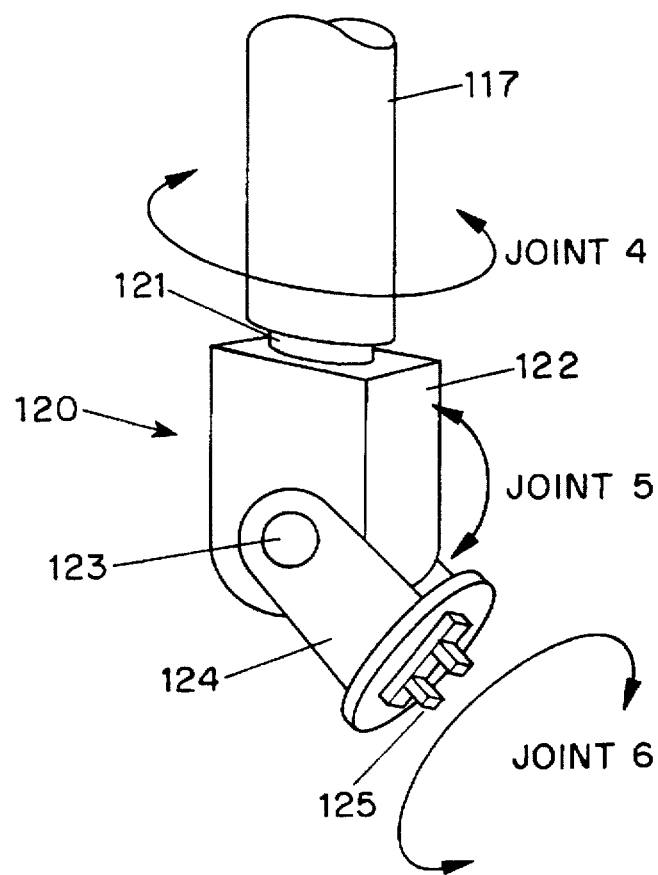

FIG. 1c is a close up of the end piece 120, and shows that the end piece 120 is made of user flange 121, U shaped piece 122, connection piece 124 and gripper mount 125 which is rotatably mounted on the connection piece 124. U shaped piece 122 is connected to connection piece 124 by way of a joint 123, which permits rotational movement within the plane defined by the U shaped piece, as illustrated by the denomination Joint5 in FIG. 1c. Rotation of the gripper mount 125 with respect to connection piece 124 permits a sixth degree of freedom of the robot, as illustrated by the denomination Joint 6. Console 160 permits the user to control the various degrees of freedom of the robot.

Of course, any robot, commercial or otherwise, may be substituted for the AdeptOne Robot. Indeed, the robot itself may simply be thought of as a movable base for mounting a gripper thereto, and it is contemplated that those skilled in the art will make various substitutions for the robot of the present embodiment while still remaining within the scope of the present invention.

Figure 2:
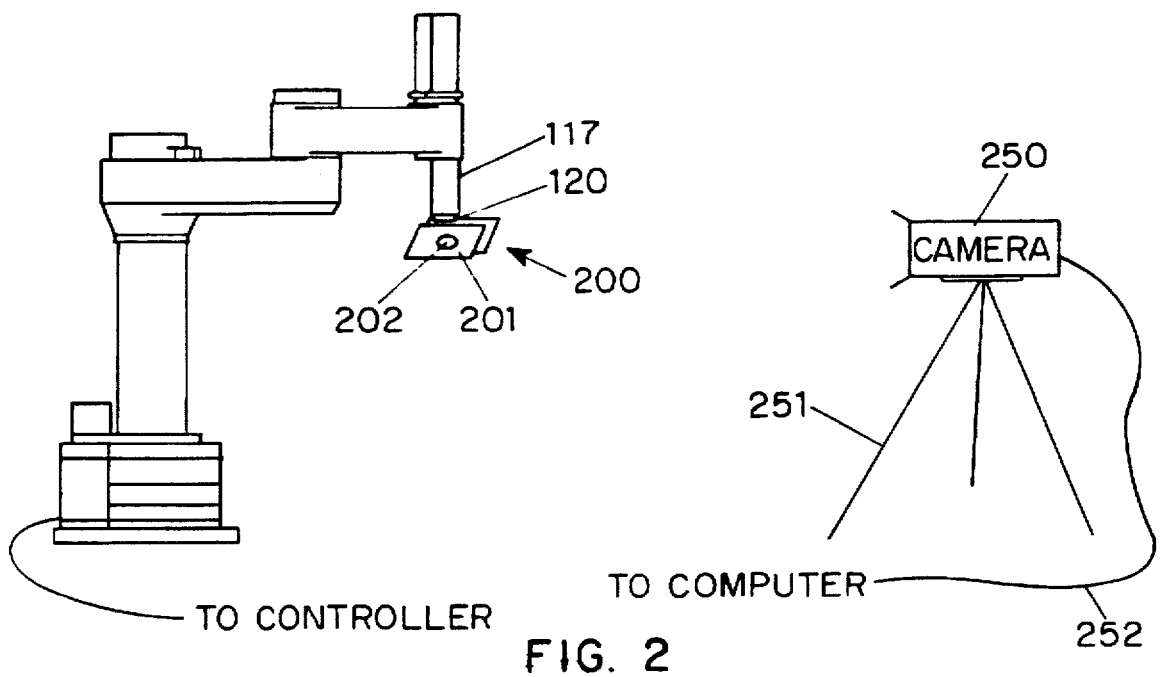
FIG. 2 is a side view and illustrative diagram depicting an embodiment of the present invention.

With reference to FIG. 2, an embodiment of the present invention is now described. A transparent gripper 200 is mounted to the end piece 120 of robot 100 via gripper mount 125, shown in FIG. 1c. The gripper 200 shown in FIG. 2 is a parallel jaw gripper having parallel faces 201, which may be used to hold and manipulate an object, such as a ball-shaped object 202. Camera 250, which uses a charge coupled device (CCD) image sensor, such as the Sony 3CCD Color Video Camera, is mounted on mount 251 and set to view the object 202 being manipulated. The camera 250 converts video images into digital video information, and provides such information through line 252 to computer 170.

If an ideally transparent material were available (i.e., a material having the same index of refraction as air and having no absorption or dispersion), a gripper 200 made of such a material would introduce no optical effects and hence would be the ideal gripper for use in the present invention. However, "transparent" materials found in practice are not truly transparent, and indeed do introduce a variety of optical effects. Accordingly, the gripper 200 should be made from an available transparent material chosen so as to minimize unwanted optical artifacts, such as refraction, reflection, total internal reflection, dispersion, and the lens effect. This consideration, which will now be discussed, impacts both the material chosen for gripper fabrication, as well as the shape of the gripper.

The optical effect of primary importance is refraction. Refraction causes a light ray to bend at the interface between the media having different speeds for the propagation of light therein. The amount of bending is governed by Snell's law:

$$\frac{\sin \alpha_1}{\sin \alpha_2} = \frac{c_1}{c_2} = n_{21}. \quad (1)$$

Here, $\alpha_1$ and $\alpha_2$ are the angles of incidence (measured with respect to the normal direction of interface) of the light rays in the first and the second media, respectively, $c_1$ and $c_2$ are the speeds of light in the two media, and their ratio $n_{21}$ is the refractive index of the second medium with respect to the first for a given wavelength of light.

In the handbooks of physics, refractive indices of various materials have been documented, and are well know in the art. Since light propagates slower in denser media, refractive indices of solids and liquids have values greater than 1, the refractive index of air. As examples, the indices of some common materials are given in the table below (except for plastic and Lucite, the values are for the wavelength of 5893 Å at 20° C.).

TABLE I

| MATERIAL | REFRACTIVE INDEX |
| --- | --- |
| Water | 1.33–1.34 |
| Ice | 1.31 |
| Glass | 1.51–1.67 |
| Celluloid | 1.49–1.50 |
| Benzine | 1.50 |
| Glycerine | 1.47 |
| Plastic | 1.48–1.61 |
| Lucite | 1.49 |

Table I shows that it is possible to select a combination of a plastic for the gripper and a liquid for the medium with nearly matching refractive indices. In an application where a robot could be immersed in liquid, refraction due to the gripper/media interface could thus be minimized, if not eliminated. Unfortunately, in most applications, objects are manipulated by the robot in air, and effects caused by refraction must be dealt with by the vision system of the robot. Certain optical phenomena related to refraction, such as total internal reflection, the lens effect, dispersion, and energy transport, must therefore be considered when designing a suitable gripper.

Total internal reflection will first be discussed. As explained above, Snell's law (1) states that a light ray is bent towards the normal direction of the interface as it enters a medium of higher refractive index. In the case of light traveling from a medium of higher refractive index to one of lower refractive index, the angle of refraction $\alpha_2$ approaches $\pi$ at some critical value of the angle of incidence. This critical angle is related to the refractive index as:

$$\alpha_{1crit} = \arcsin\left(\frac{1}{n_{12}}\right). \quad (2)$$

If the incidence angle $\alpha_1$ is increased further, the ray is reflected back from the interface as from a mirror. For such large incidence angles, Snell's law is not valid, as sin $\alpha_1$ cannot be greater than 1.

Figure 3:
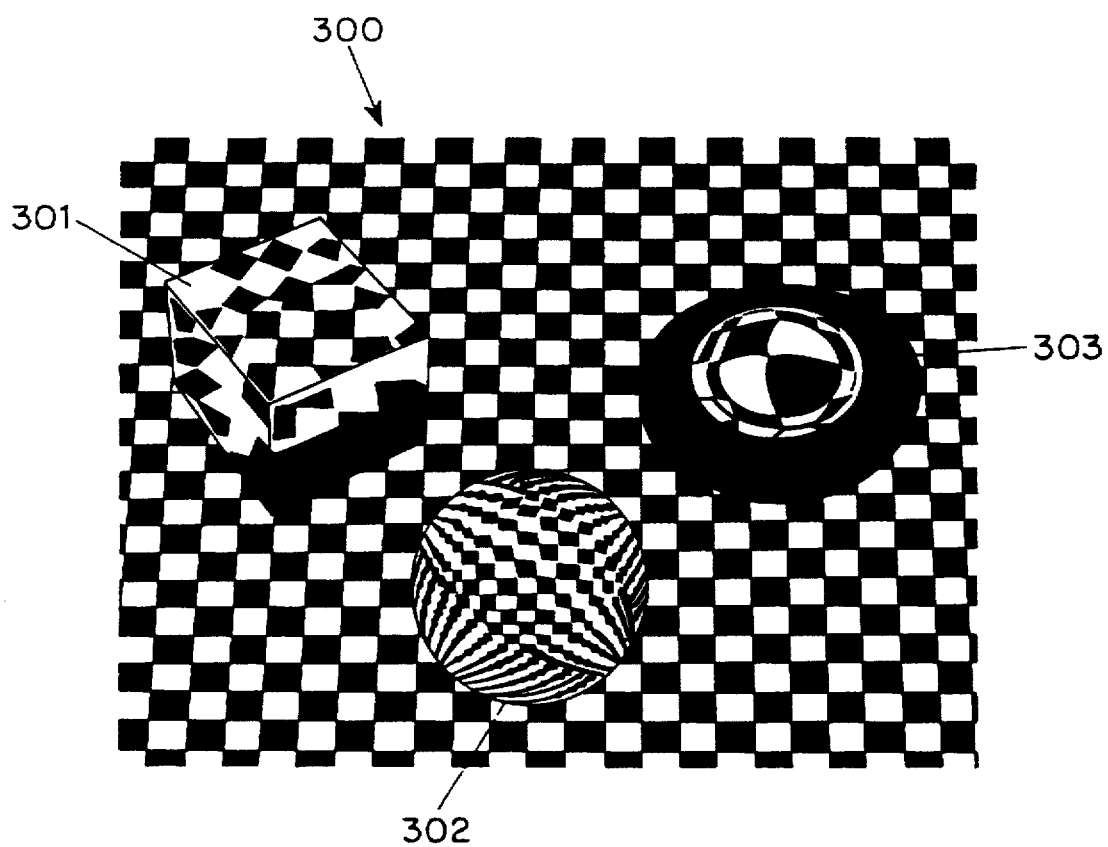
FIG. 3 is a diagram illustrating total internal reflection, severe distortion, and an invisible volume.

If a light ray attempts to emerge from within the gripper at an angle greater than the critical, the ray would be reflected back (once or even several times) before leaving the gripper. From the perspective of gripper design, total internal reflection is probably the most undesirable optical effect that a gripper can introduce, as it can render parts of a gripper effectively opaque from certain viewing angles, as illustrated by the vertical faces of the cube 301 in FIG. 3. According to equation 2, in order to have a large critical angle, $\alpha_{1crit}$, which minimizes the chances of internal reflection, the refractive index of the gripper must be kept as low as possible. In this regard, grippers made of plastic would generally have a higher critical angle than those made of glass. This is fortuitous since the brittleness of glass makes that undesirable for use in a gripper for most applications.

The lens effect is now discussed. If the surface of the gripper is not planar, the surface normal varies over the gripper/air interface. Thus, when a parallel set of rays strikes the gripper, each ray impinges the surface at a different angle of incidence. The refracted rays either converge or diverge as they enter (or leave) the gripper, depending on whether the surface is convex or concave. This can cause the image of a grasped object to be distorted or blurred, as in the case of a gripper having a spherical surface such as 302 in FIG. 3. Further, the convergence of light rays can cause large volumes behind the gripper to be invisible to the image sensor, as illustrated by the hemispherical gripper surface 303 in FIG. 3.

The lens effect, which does not manifest itself for flat faces, is less pronounced if a gripper made with thinner material. For instance, light bulbs are round but do not exhibit strong lens effects. Alternatively, a gripper made from a low density material would introduce less severe lens effects. Therefore, building a non-planar gripper requires a tradeoff between optical and mechanical properties, as a thinner gripper in general requires a stronger or more dense material having a higher refractive index, and for a given thickness would introduce a greater lens effect. Conversely, the use of a lower density material having a smaller refractive index would generally require the gripper to be thicker in order to have suitable strength. For a given refractive index, the thicker the gripper, the greater is the lens effect introduced thereby.

Dispersion will now be discussed. If a light ray consists of different wavelengths (as in the case of white light), for most materials each wavelength is refracted to a different degree, causing the original ray to be spatially separated into a spectrum of monochromatic rays. In other words, $N_{21}$ is a function of the wavelength of the light. From equation (1), the relation between dispersion at a given wavelength $\lambda$ and the angle of incidence $\alpha_1$, is:

$$\frac{\partial \alpha_2}{\partial \lambda} = -\frac{\sin\alpha_1}{n_{21}(\lambda)\sqrt{N_{21}^2(\lambda) - \sin^2\alpha_1}} \frac{dn_{21}}{d\lambda}. \quad (3)$$

Figure 4:
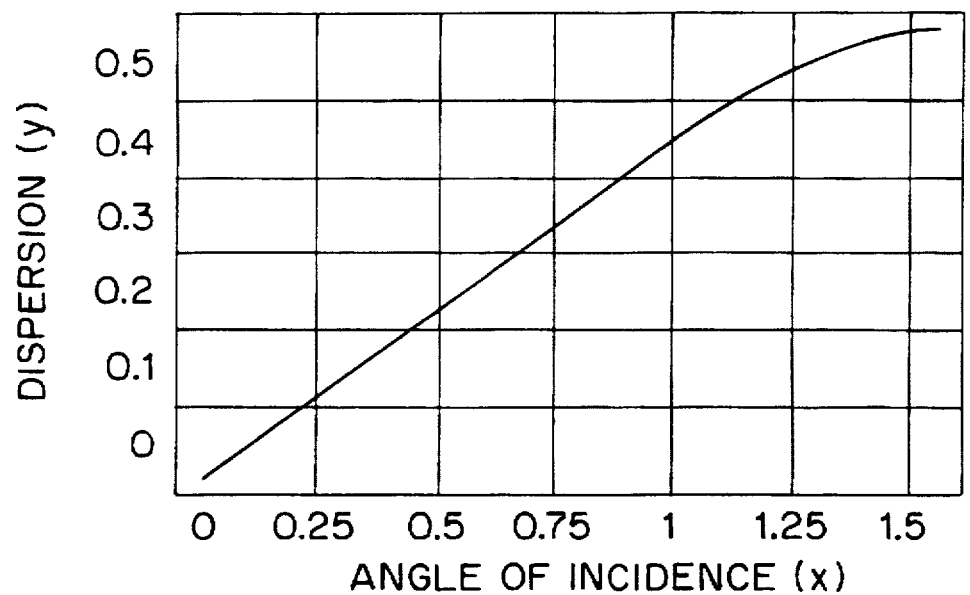
FIG. 4 is a graphical representation of absolute dispersion (y) as a function of the angle of incidence (x)

As illustrated in FIG. 4, the amount of dispersion increases with the angle of incidence. As a result, clearer images of the grasped object would be visible where the gripper surface is viewed head-on by the camera 250.

Materials that exhibit less light dispersion are obviously preferred. Generally, dispersion is not a severe problem, since it is always possible to use color filters and treat each wavelength component in isolation. Further, for many plastic materials the refractive index is almost constant for light within the visible spectrum. Most glasses, on the other hand, usually exhibit high dispersion.

Energy transport will now be discussed. At a smooth interface between two media, an incident light ray generally splits into two rays: the refracted ray discussed above and a reflected ray. Exactly how the incident energy is divided in these two directions depends on the relative refractive index of the media as well as the polarization of the incoming light. The fraction of the incident energy that is reflected and refracted (or transmitted), for linearly polarized incident light, are derived from Fresnel's equations to be:

$$r_\perp = \left[ \frac{\sin(\alpha_1 - \alpha_2)}{\sin(\alpha_1 + \alpha_2)} \right]^2, \quad (4)$$

$$t_\perp = 1 - r_\perp, \quad (5)$$

$$r_\parallel = \left[ \frac{\tan(\alpha_1 - \alpha_2)}{\tan(\alpha_1 + \alpha_2)} \right]^2, \quad (6)$$

$$t_\parallel = 1 - r_\parallel. \quad (7)$$

Figure 5:
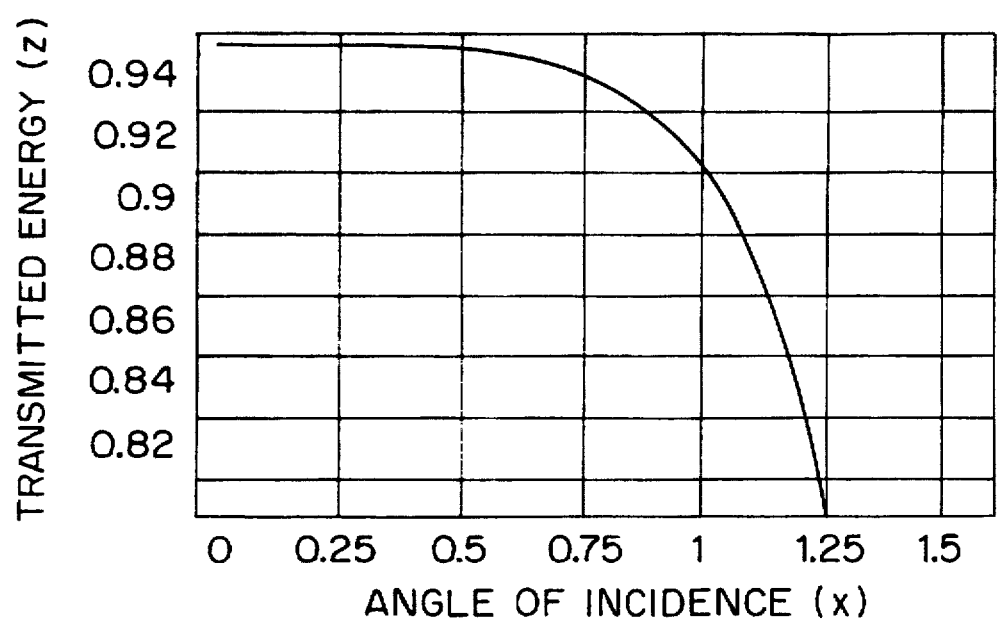
FIG. 5 is a graphical representation of the percentage of transmitted energy of unpolarized light (z) against the angle of incidence (x)

Here, $r_\perp$ and $t_\perp$ are the reflected and refracted energies for incident light that is polarized perpendicular to the plane of incidence, and $r_\parallel$ and $t_\parallel$ are the energies for light with parallel polarization. Ambient illumination tends not to be polarized but rather unpolarized. In this case, the fraction of the energy that is refracted (transmitted) is simply $(t_\perp + t_\parallel)/2$. For a refractive index of n=1.5 (glass to air), when the incident light is normal to the surface, 96% of the incident energy is transmitted through and only 4% is lost in reflection. FIG. 5 shows a plot of transmitted energy (as the fraction of incident energy) plotted as a function of the angle of incidence for unpolarized light. Finally, not all the light energy transmitted through the gripper reaches the image sensor 250. Some of the energy is absorbed by the gripper material.

Because reflected light produces undesirable highlights and multiple reflections in the image, the gripper to air interface should have low reflectivity. Since reflectivity increases with the refractive index, materials with lower refractive indices are preferred (again, plastic over glass). By applying a conventional anti-reflective coating the gripper surfaces, it is possible to reduce the amount of reflected light significantly. While using a camera 250 that senses structured light, such as light stripe range finders, incident light may be polarized used a filter. Since the reflected light tends to preserve the polarization of incident light, a cross-polarized filter at the sensor end would help block out a large fraction of the specularly reflected light which tends to be polarized.

An optimal gripper would be one whose shape and material properties minimize the above-discussed undesirable optical effects, namely, total internal reflection, lens effects leading to distortion and obscuration, dispersion, and low transmissivity. As previously discussed, certain plastics have desirable material properties. In our preferred embodiment, the gripper is fabricated from polymethyl methacrylate, commercially available as Lucite in the form of pre-fabricated sheets of varying thickness. Lucite has the following important properties. It has a low refractive index of 1.49 (critical angle 42°), it has negligible dispersion (wavelength dependence) in the visible region of the spectrum, and it absorbs a very small fraction of the incident light.

Figure 6A:
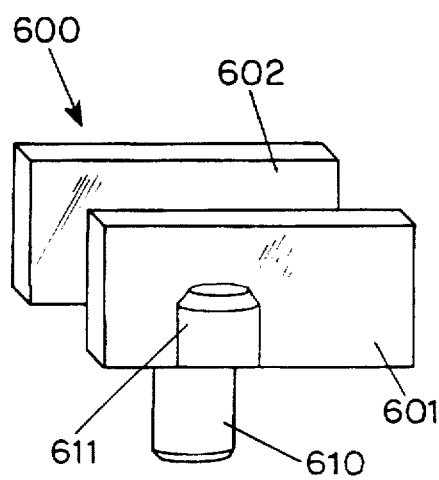
FIGS. 6a and 6b are diagrams illustrating an image shift caused by refraction through a transparent gripper and the same image after refraction compensation, respectively.

Referring to FIG. 6a, Lucite plates may be used to form two rectangular planar gripper components 601, 602 that are used in an otherwise standard pneumatic parallel-jaw mechanism 600. The planar faces of the gripper components 601, 602 avoid the lens effect, and refraction effects cause only a constant shift of the image 610, 611 of the object held by the gripper. This shift can readily be compensated by processing the image information. The thin side faces of the two plates 601, 602 do produce total internal reflections, but such internal reflects obscure only relatively small areas of the image, and the consequence of this effect can be avoided by taking multiple images of the object at different positions.

In order to determine which areas in the image are affected by refraction, it is necessary to establish the image projections of the two transparent parallel jaws of the gripper. In commercially available robots, the position and orientation of the robot end effector in the world coordinate system is pre-calibrated; hence, the position and orientation of the gripper is likewise always known, as the gripper is directly attached to the end-effector. In the embodiment shown in FIG. 2, the camera 250 remains fixed, so the relative positions and orientations of world and image coordinate systems are constant. The projection of the gripper 200 onto the image plane can therefore be determined if the camera is calibrated with respect to the world frame. By neglecting lens distortions in the imaging optics, and using the perspective projection model, the transformation between the world and camera frames can be represented as a 4×4 matrix in homogeneous coordinates.

$$\begin{pmatrix} x' \\ y' \\ z' \\ w' \end{pmatrix} = \begin{pmatrix} m_{11} & m_{12} & m_{13} & m_{14} \\ m_{21} & m_{22} & m_{23} & m_{24} \\ 0 & 0 & 0 & 0 \\ m_{41} & m_{42} & m_{43} & 1 \end{pmatrix} \cdot \begin{pmatrix} x \\ y \\ z \\ 1 \end{pmatrix} \quad (8)$$

Here, x, y, and z are world coordinates, and x', y', z', and w' are homogeneous image coordinates. These are related to any measured image plane coordinates, $\tilde{x}$ and $\tilde{y}$, as:

$$\tilde{x} = \frac{x'}{w'} = \frac{m_{11}x + m_{12}y + m_{13}z + m_{14}}{m_{41}x + m_{42}y + m_{43}z + 1} \quad (9)$$

$$\tilde{y} = \frac{y'}{x'} = \frac{m_{21}x + m_{22}y + m_{23}z + m_{24}}{m_{41}x + m_{42}y + m_{43}z + 1} \quad (10)$$

If the arbitrary scale factor $m_{44}$ is set to 1, there are eleven parameters to determine through calibration. Since each point in the scene gives a pair of linear equations, (9) and (10), the world and image plane coordinates of six points provide enough information to determine the eleven unknowns. The eleven unknown $M_{ij}$'s are determined by calibration. Given such calibration data, projection of the world frame locations of the 8 corners of each of the two gripper plates 601, 602, to determine all the projection polygons corresponding to the planar faces of the gripper is readily obtained. These polygons determine the regions of refraction in the image.

In the absence of total internal reflection, a flat slab of transparent material does not change the direction of light passing through it. A light ray gets refracted twice, once at the point of entry into the slab and next at the point of exit. Since the media involved in both refractions are the same, but play reverse roles at the two points, the relative refractive indices are reciprocal to each other. Thus, the overall effect of refraction is no more than a parallel shift of the image of the object seen through the gripper. The amount of this shift, $\Delta$, depends on the refractive index $n_{21}$, the incidence angle $\alpha_1$, and the thickness of the refracting slab h as follows:

$$\Delta = \frac{h \sin(\alpha_1 - \alpha_2)}{\cos \alpha_2} = h \left( \sin \alpha_1 - \frac{\cos \alpha_1 \sin \alpha_1}{\sqrt{n_{21}^2 - \sin^2 \alpha_1}} \right) \quad (11)$$

From the relation for the shift, $\Delta$, in equation (11) it follows that a light plane with a unit normal passing through a flat transparent gripper may be represented as follows:

$$\alpha x + \beta y + \gamma z + \delta = 0 \rightarrow \alpha x + \beta y + \gamma z + (\delta \pm \Delta) = 0, \quad (12)$$

where, the sign in front of $\Delta$ depends as the sign of the dot product of the normals to the light plane and the plane of refraction. Since any straight line can be represented as a pair of plane equations, equation (12) is valid for both planes and lines.

Figure 6B:
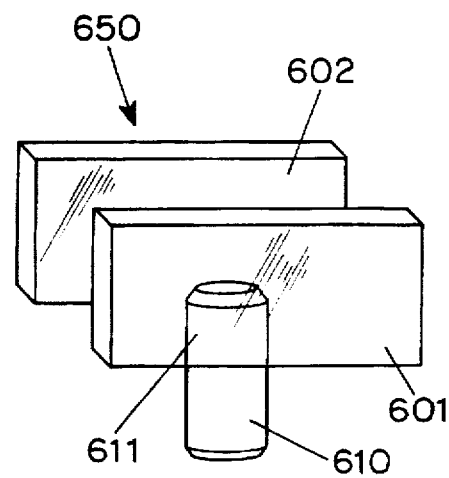

If image formation can be approximated as either orthographic or weak-perspective projection, it is possible to restore an image by a parallel shift of a portion of the image by using equations (11) and (12). Such a correction operation may be performed by computer 170 to the image data for the image in FIG. 6a, to construct compensated image data of a gripped which corresponds to the compensated object image 610, 612 shown in FIG. 6b.

Figure 7A:
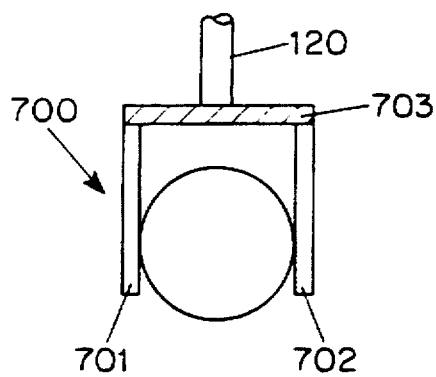
FIGS. 7a, 7b and 7c are diagrams depicting a preferred embodiment of the present invention where three dimensional information is retrieved.
Figure 7A:
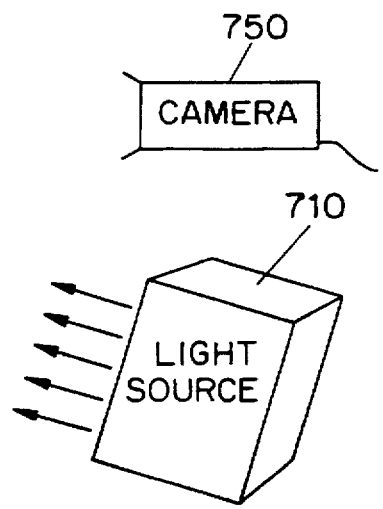
Figure 7B:
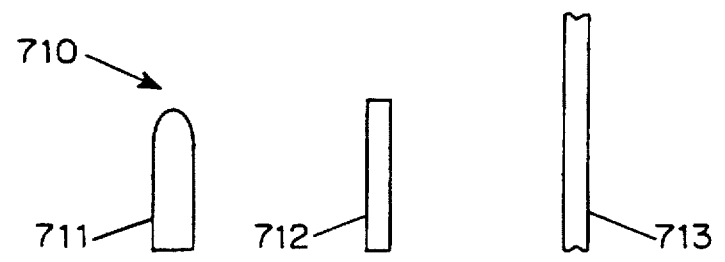
Figure 7C:
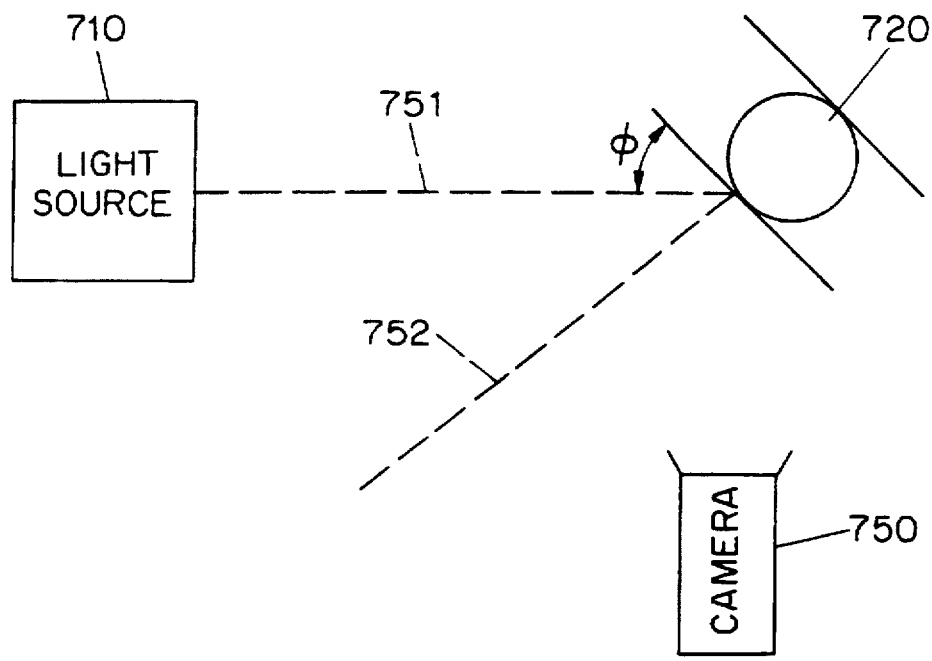

In one aspect of our invention, refraction-corrected three dimensional object model acquisition is performed by computer 170 to generate a corrected depth map for the gripped object. Referring to FIG. 7a, a light plane source 710 is added to the system including a parallel jaw griper 700 and camera 750. As shown in FIG. 7b, the light plane source includes a light source 711, a condensing lens 712, and a slit 713. The light plane source is preferably a laser. As shown in FIG. 7c, the light plane 751 will intersect the front gripper plate 701 at an angle θ from the plane defined by the gripper plate. The angle θ must be less than 90°, i.e., the normal to the gripper plate 752, in order to retrieve depth information. In addition, θ should be selected at some angle greater than 0° so that the light plane will pass through the gripper plate 701 to illuminate the gripped object 720. The minimum value will depend on the thickness of the gripper plate 701.

Figure 8A:
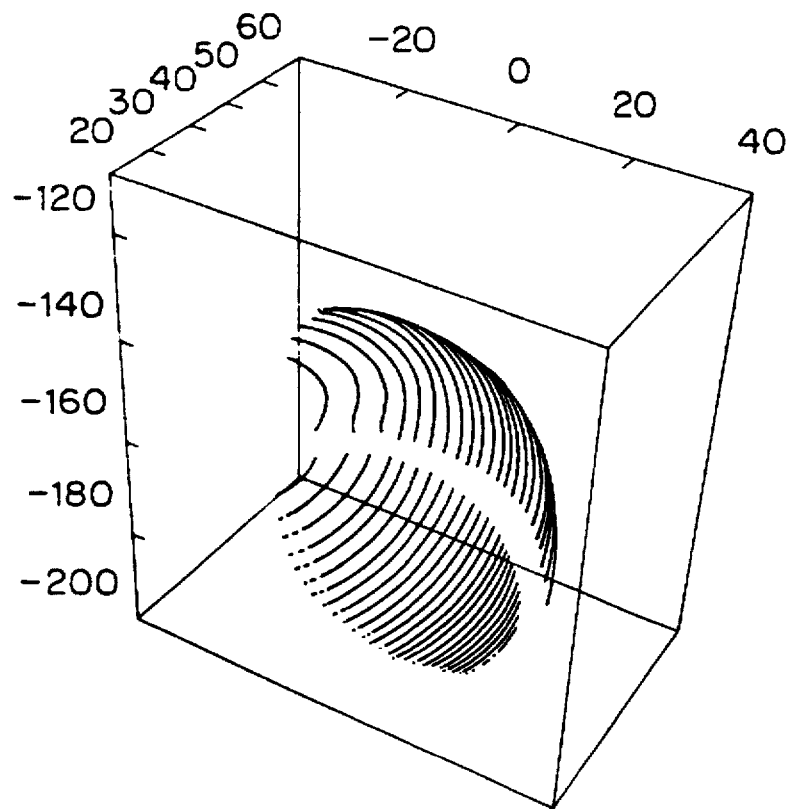
FIGS. 8a and 8b show depth maps of a ball computed without and with refraction compensation, respectively.
Figure 8B:
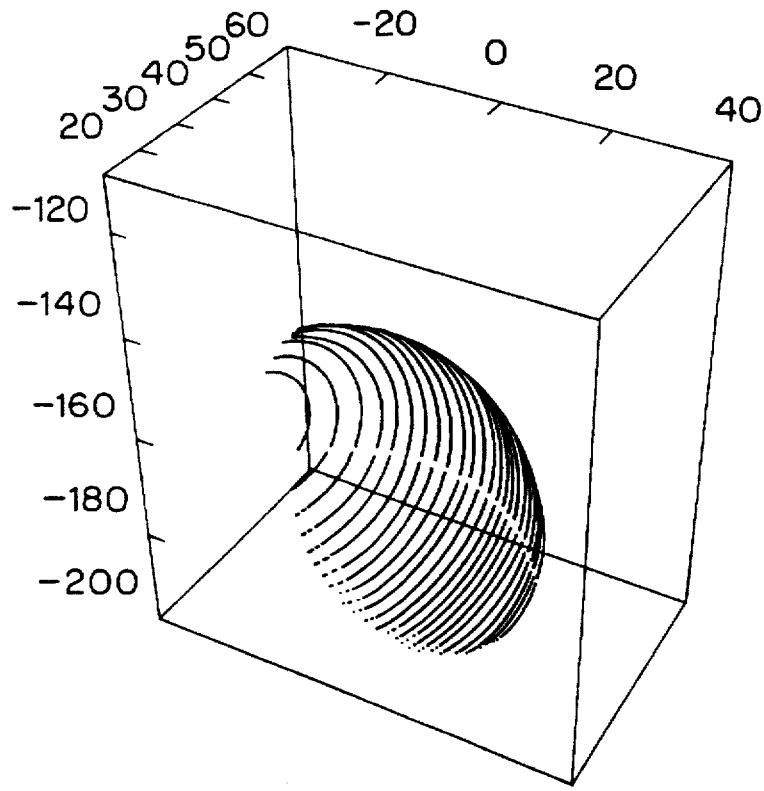

The light plane must be first calibrated with respect to the gripper and the camera. Once this done, for each bright point in the image, the world coordinates of the corresponding scene point can be determined by solving a system of three linear equations: the equation of light plane and the two equations of a straight line passing through the image point and the focal point of the camera. All three equations would have to be corrected using equations (11) and (12) if their point of intersection lies behind the transparent gripper. The foregoing operations may be performed by computer 170 executing a simple software routine. An example routine, which is written in C++, is included in the Appendix of this Specification and will compute corrected depth information for an object gripped by the above-discussed parallel haw grippers. FIG. 8a shows the depth map of the object recovered without refraction compensation. FIG. 8b shows the depth map after correction. Three-dimensional depth maps may be displayed as wireframes at frame rate on a bit-mapped workstation, such as the general purpose computer 170.

Figure 9:
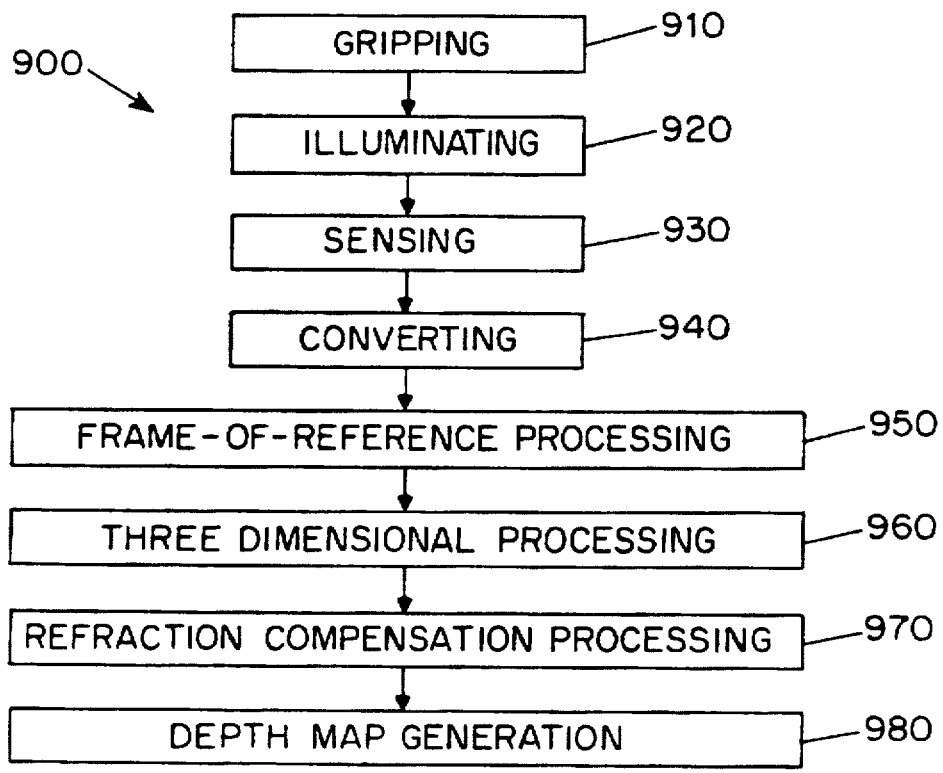
FIG. 9 is a flowchart of a method for retrieving three dimensional information according to the present invention.

Referring to FIG. 9, a method for generating refraction-corrected three dimensional object information in the form of a depth map is now described. Flow chart 900 describes the necessary steps for generating a refraction-corrected depth map such as the depth map shown in FIG. 8b. The steps require gripping 910 an object and illuminating 920 the object with a light plane before sensing 930 the image of the object. The sensed image is converted 940 into digital image data which may first be subjected to frame-of-reference processing 950, to give world coordinate meaning to the digital information. Next, the processed image data is subjected to three dimensional processing 960 to generate depth information for the gripped object. The generated depth information is subjected to refraction compensation processing 970 to convert the depth information into refraction-corrected depth information. Finally, a corrected depth map 980 may be generated.

While existing grippers execute manipulation tasks, they occlude parts of the objects they grasp as well as parts of the workspace from vision sensors. The present invention introduces a transparent gripper that enables vision sensors to image an object without occlusion while it is being manipulated. Refraction, total internal reflection, lens effects, dispersion and transmittance are taken into account when determining the geometry and material properties of a practical transparent gripper. By compensating for image shifts caused by refraction, the generation of three dimensional object data is enabled when using the transparent gripper.

Figure 10A:
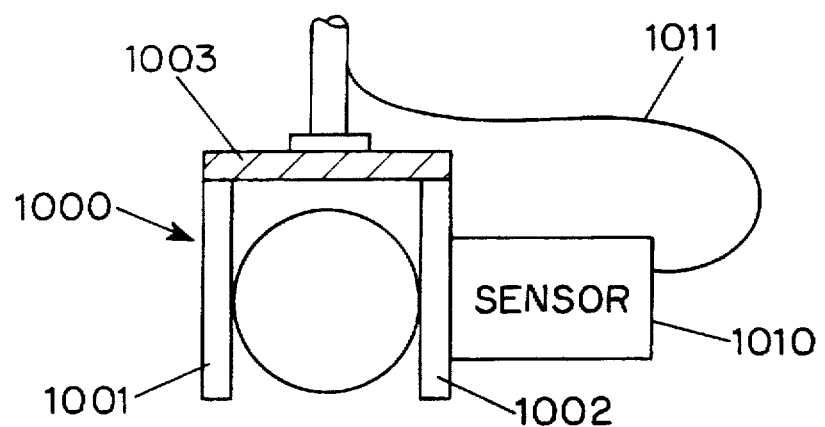
FIGS. 10a and 10b are diagrams depicting alternative embodiments of the present invention.
Figure 10B:
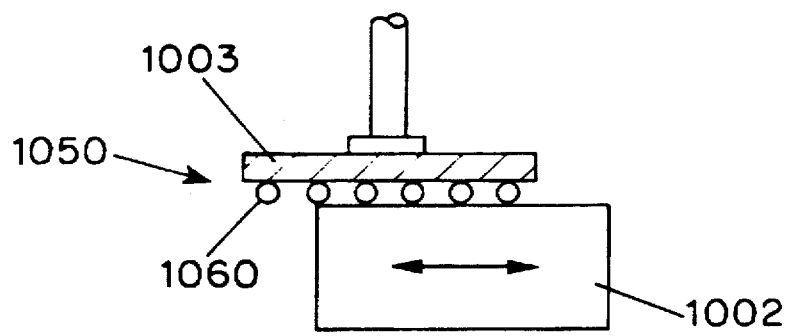

The foregoing merely illustrates the principles of the invention. Various modifications and alterations to the described embodiments will be apparent to those skilled in the art in view of applicants' teachings, herein. For example, as illustrated by gripper 1000 in FIG. 10a, with a transparent gripper 1002, a sensor 1010 connected to computer 170 via line 1011 can be attached to the gripper's outer surface. The image sensor 1010 may be one of several types, ranging from proximity sensors to regular CCD cameras. Materials other than Lucite, that yield desirable optical properties may of course be used to construct the grippers. In addition, as illustrated by gripper 1050 in FIG. 10b, the gripper plate 1002 may be slidably attached to mounting piece 1003 via bearings 1060, to enable translational movement of the gripper plate with respect to mounting piece. One or both of the gripper plates may be so mounted to prevent damaging the object being gripped. A technique for the slidable attachment of a gripper plate to a mounting piece is further described in U.S. Pat. No. 5,098,145, to Goldberg, which patent is incorporated by reference herein.

Figure 11A:
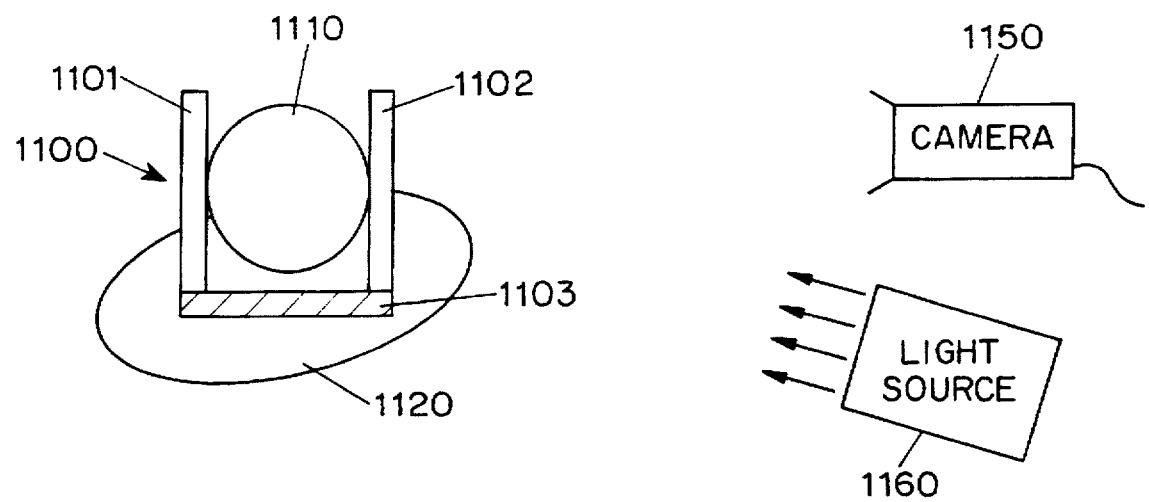
FIGS. 11a and 11b are diagrams depicting further alternative embodiments of the present invention.
Figure 11B:
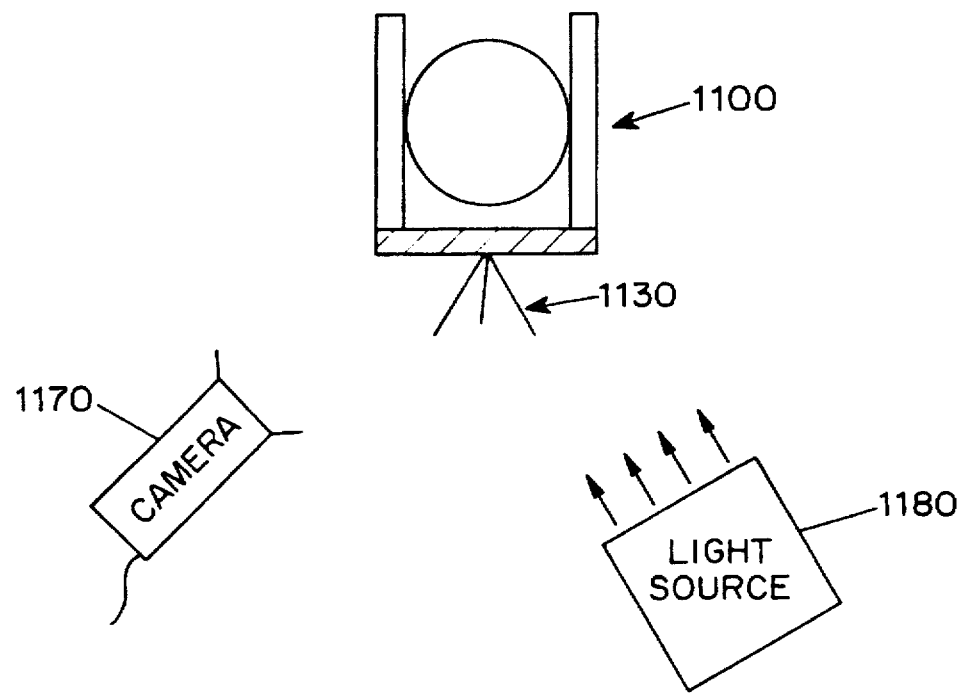

In the embodiment of FIGS. 7a and 7b, only a single fixed stripe of light is needed for depth recovery, since the robot 100 has sufficient degrees of freedom to show the object of interest to the light stripe in any desired orientation. In general, this enables the robot to show deep concavities and surface patches that suffer from self-occlusions to the sensor. However, those skilled in the art will appreciate that a robot with fewer degrees of freedom may be used. Indeed, as show in FIG. 11a, a transparent gripper 1100 including transparent gripper plates 1101 and 1102 and mounting piece 1103 may be suitably mounted on a simple rotating base 1120 to enable camera 1150 multiple views of the object 1110 being held by the gripper 1110 and illuminated by the light stripe source 1160. A similar effect is created by the use of a movable stripe light source 1180 and movable camera 1170 with a gripper 1110 that is fixed to a stationary base 1130.

Moreover, although the embodiment of FIGS. 7a and 7b is directed to a active depth estimation technique, well-known passive depth estimation methods, such as stereo, structure from motion, and depth from defocus, may be used with slight modifications to account for the refractions. With such a passive technique, the camera 750 must sense two or more images of the gripped object, and provide digital image data to computer 170 for processing in accordance with the chosen passive technique.

Further, although the foregoing was discussed with respect to parallel jaw grippers, a natural extension would be the design of transparent grippers with more complex shapes. It will thus be appreciated that those skilled in the art will be able to devise numerous systems and methods which, although not explicitly shown or described herein, embody the principles of the invention and are thus within the spirit and scope of the invention.

APPENDIX

```
// compute depth information from images
// taken with the light plane depth finder void
HandEye::depth(const ColorSequence& seq, const LValue
threshold)
{
  Off(); // turn off the online mode
         // now robot arm movements are imaginary
         // (but the robot software will return
         // transformation matrices
  Point3D pointTool[10000]; // array of depth points int
  points=0;
  // for every image in a sequence
  for (int k=0;k<seq.Length();k++)
  {
      // retrieve the robot arm position
      const Pose& pose(*seq.Position(k));
      // emulate setting the robot arm in the given position
      positionTo(pose);
      LugColorImage* colorImage=seq.Image(k);   // get the
  color image
      // turn on the debugging - images will be shown
  on-screen
      toolbox.debug(*colorImage);
      LugColorImage debugImage(*colorImage);
      // threshold the image: keep only the brighest pixels
      // (brighter than a certain threshold value)
      colorImage->threshold(threshold,1);
      // draw the grippers' contours on the debug image
      paintGripper(&debugImage,WhiteColor);
```

-26-

```
           toolbox.debug(debugImage);   // display the image
           // make a gray-level image out of the color one
           LugGrayImage grayImage(*colorImage);
           // for every horizontal pixel scan line
 5         for(int i=0;i<grayImage.Vsize();i++)
           {
             int j=0;
             Float ci=i;   // bright dot's X coordinate - scan line
        number
10           Float cj;     // Y coordinate - will determine it
             int found=0;  // will be 1 if the dot is found
             // scan the line looking for bright dots
             while(j<grayImage.Hsize())
             {
15             // get X and Y coordinates of the next dot
             if (!toolbox.dot(&cj,i,&j,grayImage))
               found++;
             }
             // now ci and cj have the coordinates of
20           // the rightmost bright dot on the line
             if (found) // if any
             {
               // print the image coordinates
               cout << "point (" << ci << "," << cj << ")" << endl;
25             // light up the dot on the image on the screen
           debugImage.set(ci,cj,YellowColor);
               map(pointTool+points,ci,cj); // calculate depth
               // print calculated coordinates
             cout << "3D point: " << pointTool[points] << endl;
30           points++; // so one more depth point processed
```

```
            }
        }
        // redisplay the image - located bright dots are marked
        toolbox.debug(debugImage);
 5      delete colorImage;    // get rid of the original image
    }
    FILE* out=fopen("map.m","w"); // open file to store depth
    info
    if (!out) // if could not open - say so
10  {
        cerr << "Cannot create map file." << endl;
    }
    else // write the file in a format readable for
    Mathematica 2.2
15          // (details probably not that important)
    {
        // set the range for the Mathematica plot routine -
        // some ad hoc values for the used gripper configuration
        float xmin=left->CornerPoint(0).X();
20      float xmax=left->CornerPoint(3).X();
        float ymin=-left->CornerPoint(4).Y()-50;
        float ymax=left->CornerPoint(4).Y()+50;
        float zmin=left->CornerPoint(0).Z();
        float zmax=left->CornerPoint(1).Z();
25      // write it
        fprintf(out,"range={{%f,%f},{%f,%f},{%f,%f}};\n",
            xmin,xmax,ymin,ymax,zmin,zmax);
        // start writing the list of point
        fprintf(out,"map={\n");
```

```
        for(int i=0;i<points;i++) // for every depth point in
    the array
        {
            Point3D& p(pointTool[i]); // retrieve the point
5           fprintf(out,"{%f,%f,%f}",float(p.X()),
                float(p.Y()),float(p.Z())); // write its coordinates
            if (i!=points-1) // separate them with commas
            fprintf(out,",");
            fprintf(out,"\n"); // carriage return after every
10  point
        }
        fprintf(out,"};\n");   // close the list of points
        fclose(out); // close the output file
    }
15  sleep(2); // let the user look at the displayed image for
    2 seconds
    }
    // calculate depth of a given bright point on the image
    // ci and cj are image coordinates of the bright point
20  void HandEye::map(Point3D* rTool, const Float ci, const
    Float cj)
    const
    {
        // build the equation of the line passing
25      // through the image point and the focal point ("image
    line")
        // the line is represented as an intersection of two
    planes
        // passing through the focal point:
30      // the first parallel to the image's Y axis,
```

```
      // the second parallel to the X axis
      GRowVectorD4 pA;
      GRowVectorD4 pB;
      // prepare to calculate the four (A,B,C,D) coefficients in
5     // Ax + By + Cz + D = 0 for both planes
      for(int k=0;k<4;k++)
      {
         // mWorld2Image is the 4x4 matrix transforming
         // image coordinates to world coordinates,
10       // calculated at calibration stage
         pA(k)=mWorld2Image(0,k)-ci*mWorld2Image(3,k);
         pB(k)=mWorld2Image(1,k)-cj*mWorld2Image(3,k);
      }
      // build the two planes' equations in the tool coordinate
15    system
      // mTool2World is the 4x4 matrix transforming tool
      // (end-effector-related) coordinates into world
      coordinates;
      // notice that we have to mupltiply the plane coefficients
20    row
      // from the right by that matrix
      Plane3D planeA(pA*mTool2World);
      Plane3D planeB(pB*mTool2World);
      // build an "image line" as the intersection of both of
25    them
      Line3D imageLineTool(planeA,planeB);
      // get the light plane's equation, calculated at
      calibration stage
      Plane3D lightPlaneTool=lightPlane;
30    // transform to the tool system
```

```
        lightPlaneTool=lightPlaneTool*mTool2World;
        // initialize the image line hitting the grasped object
        // to the unrefracted image line
        Line3D imageLineUsed(imageLineTool);
 5      // the same with the light plane
        Plane3D lightPlaneUsed(lightPlaneTool);
        // print their coefficients
        cout << "imageLineUsed="
             << imageLineUsed.planeA << " "
10           << imageLineUsed.planeB << endl;
        cout << "lightPlaneUsed=" << lightPlaneUsed << endl;
        // if the image line hits the gripper's slab,
        // we need to compensate for refraction
        // does the image line passe through the gripper?
15      if (left->hit(0,imageLineTool)==0) // yes
        {
          // refract the image line
          left->refract(&imageLineUsed,imageLineTool);
          // refract the light plane
20        left->refract(&lightPlaneUsed,lightPlaneTool);
          // NOTE: here we assumed for simplicity that
          // either both image line and the light plane both pass
          // through the gripper, or neither of them does,
          // so it would be enough to check only the image line
25        // for intersection. In the actual setup that assumption
          // was valid. In the general case we would have
          // to check both of them.
        }
        // print the resulting values
30      cout << "imageLineUsed="
```

```
             << imageLineUsed.planeA << " "
             << imageLineUsed.planeB << endl;
        cout << "lightPlaneUsed=" << lightPlaneUsed << endl;

// calculate the intersection of the image line
5       // with the light plane to get the depth point;
        // the result will be stored in the rTool variable
        lightPlaneUsed.intersect(rTool,imageLineUsed);
    }
    // calculate the equation of the plane
10  // refracted through the gripper
    void GripperPlate::refract(Plane3D* rplane, const Plane3D&
    iplane) const
    {
        // get the thickness of the gripper
15      Float thickness=backPlane.D()-frontPlane.D();
        // get gripper's front face normal vector
        Vector3D n1; frontPlane.N(&n1);
        // get the original plane's normal
        Vector3D n2; iplane.N(&n2);
20      // fine dot product of the normals
        Float dot=n1.X()*n2.X()+n1.Y()*n2.Y()+n1.Z()*n2.Z();
        // initialize the refracted plane's parameters with
        // the original plane's equation coefficients:
        // the plane is represented as a vector (A,B,C,D) of
25  coefficients where A, B, and C are the component of a unit
    normal to the plane.
        // of the plane equation Ax + By + Cz + D = 0.
        *rplane=iplane;
        if (dot!=0) // plane not parallel to the gripper
```

```
    {
        Vector3D cross; // cross product
        // calculate the cross product
        cross.X()=n1.Y()*n2.Z()-n1.Z()*n2.Y();
5       cross.Y()=n1.Z()*n2.X()-n1.X()*n2.Z();
        cross.Z()=n1.X()*n2.Y()-n1.Y()*n2.X();
        // calculate incidence angle
        Float alpha=M_PI/2.-asin(cross.norm3());
        // print the calculated value
10      cout << "incidence angle=" << alpha << endl;
        cout << "sin(alpha)=" << sin(alpha) << endl;
        cout << "sin(alpha)/rindex=" << sin(alpha)/rindex <<
    endl;
        cout << "asin(sin(alpha)/rindex)="
15           << asin(sin(alpha)/rindex) << endl;
        // calculate angle of refraction;
        // rindex is the index of refraction if the gripper's
    slab
        Float beta=asin(sin(alpha)/rindex);
20      // print it
        cout << "refraction angle=" << beta << endl;
        // calculate the refraction shift
        Float offset=thickness*sin(alpha-beta)/cos(beta);
        // determine the shift sign
25      if (dot>0) // depending on the dot product's sign
        {
           cout << "dot>0" << endl;
           cout << "refraction shift by " << +offset << endl;
           // add the shift to the D coefficient
30         rplane->D()+=offset;
```

```
        }
        else
        {
            cout << "dot<0" << endl;
            cout << "refraction shift by " << -offset << endl;
            // subtract the shift from the D coefficient
            rplane->D()-=offset;
        }
    }
}
// refract the equation of a line passing through the
gripper
void GripperPlate::refract(Line3D* rline, const Line3D&
iline) const
{
    // we represent a line as an intersection of two planes,
    // so refracting it means just refracting both of these
planes
    refract(&(rline->planeA),iline.planeA); // refract the
first plane
    refract(&(rline->planeB),iline.planeB); // refract the
second plane
}
```

We claim:

1. A robot for manipulating an object, comprising:
   (a) an end effector forming a mechanical component of said robot;
   (b) a substantially entirely transparent gripper, mechanically coupled to said end effector, to grip said object being manipulated;
   (c) an optical image sensor, optically coupled to said transparent gripper, to sense an image of said object through a surface of said transparent gripper, and for converting a sensed image of said object into image data; and
   (d) image data processing apparatus, coupled to said sensor, for processing said image data to remove optical artifacts, including distortion due to refraction, introduced by said gripper therefrom.

2. The robot of claim 1, wherein said transparent gripper is a parallel jaw gripper comprising:
   (a) a mounting piece; and
   (b) two substantially transparent parallel jaws, each jaw having a top portion, wherein each of said parallel jaws is connected to said mounting piece at said top portion.

3. The robot of claim 2, wherein said mounting piece of said parallel jaw gripper is connected to said top portion of a first of said two parallel jaws by at least one bearing, whereby said first parallel jaw is capable of translational movement with respect to the other of said two parallel jaws.

4. The robot of claim 2, wherein said optical sensor is connected to an outer face of one of said parallel jaws.

5. The robot of claim 1, wherein said transparent gripper is made from a substantially transparent plastic material.

6. The robot of claim 5, wherein said transparent gripper is made from polymethyl methacrylate.

7. The robot of claim 1, wherein said sensor is a charged coupled device sensor.

8. The robot of claim 1, wherein said robot is a robot having at least five degrees of freedom.

9. The robot of claim 1, wherein said image data processing apparatus is further adapted to perform transformation processing prior to performing optical distortion processing, whereby said image data is transformed from data corresponding to a frame of reference of said optical sensor to data corresponding to a world frame of reference.

10. The robot of claim 1, further comprising:
    (e) a light plane source, optically coupled to said transparent gripper and to said optical sensor, for illuminating said object with a plane of light sensible by said optical sensor;
wherein said optical sensor is a light stripe range finder and said image data processing apparatus is further adapted to perform three-dimensional image processing to thereby retrieve three-dimensional information for said object.

11. The robotic vision system of claim 10, further comprising:
    (f) depth map storage means, coupled to said image processing apparatus, for storing derived three-dimensional information for said object as a depth map.

12. The robotic vision system of claim 11, further comprising:
    (g) display means, coupled to said depth map storage means, for displaying said depth map as a wireframe on a bitmapped workstation.

13. An apparatus for manipulating an object, comprising:
    (a) a gripper base;
    (b) substantially entirely transparent gripper means, connected to said gripper base, for gripping said object;
    (c) sensor means, optically coupled to said transparent gripper means, to sense an image of said object through a surface of said transparent gripper means and for converting a sensed image of said object into image data; and
    (d) image data processing means, coupled to said sensor means, for processing said image data to remove optical artifacts, including distortion due to refraction, introduced by said gripper means therefrom.

14. The apparatus of claim 13, wherein said sensor means is an active sensor.

15. The apparatus of claim 13, wherein said sensor means is adapted to sense a plurality of images of said object, and said image data processing means is adapted to perform three-dimensional image processing to thereby retrieve three-dimensional information for said object.

16. The apparatus of claim 15, wherein said gripper base is a rotatable base and said plurality of images of said object are sensed by rotating said base.

17. The robotic vision system of claim 15, further comprising:
    (e) a movable light plane source, optically coupled to said transparent gripper means and to said sensor means, for illuminating said object with a plane of light sensible by said sensor means,
wherein said sensor means is a movable camera, and said plurality of images of said object are sensed by moving said movable light plane source and said camera to a plurality of different positions corresponding to each of said images.

18. A method for manipulating an object by a robot, comprising the steps of:
    (a) gripping said object with a substantially entirely transparent gripper;
    (b) sensing an image of said object, through a surface of said substantially entirely transparent gripper;
    (c) converting said sensed image into image data; and
    (d) processing said image data to remove any optical artifact, including distortion due to refraction, introduced by said gripper therefrom, whereby data for a substantially undistorted image of said object is generated.

19. The method of claim 18, further comprising illuminating said object with a plane of light prior said sensing step, wherein said sensing step comprises sensing an image of said illuminated object, and said image processing step further comprises performing three-dimensional image processing to thereby retrieve three-dimensional information for said object.

20. The method of claim 18, wherein said sensing step comprises sensing two or more images of said object, and said image processing step further comprises performing three-dimensional image processing to thereby retrieve three-dimensional information for said object.

* * * * *

UNITED STATES PATENT AND TRADEMARK OFFICE
CERTIFICATE OF CORRECTION

PATENT NO. : 5,802,201
DATED : September 1, 1998
INVENTOR(S) : Nayar et al.

It is certified that error appears in the above-identified patent and that said Letters Patent is hereby corrected as shown below:

Title page, insert item

[56] Ref's Cited (OTHER PUBLICATIONS): "W. German" should read -- W. Germany --

Col. 4, line 59: "include" should read -- includes --

Col. 7, line 7: "if" should read -- in --

Col. 7, line 64: "$t_{195}$" should read -- $t_\perp$ --

Col. 8, line 16: "coating the" should read -- coating to the --

Col. 12, line 6: "gripper 1110" should read -- gripper 1100 --

Col. 9, equation (9):

$$\text{``}\frac{y'}{x'}\text{''} \quad \text{should read} \quad -- \frac{y'}{w'} --$$

UNITED STATES PATENT AND TRADEMARK OFFICE
CERTIFICATE OF CORRECTION

PATENT NO. : 5,802,201
DATED : September 1, 1998
INVENTOR(S) : Nayar et al.

It is certified that error appears in the above-identified patent and that said Letters Patent is hereby corrected as shown below:

Col. 10, line 26: "haw" should read -- jaw --

Col. 12, line 3: "gripper 1110" should read -- gripper 1100 --

Signed and Sealed this

Ninth Day of May, 2000

Attest:

Attesting Officer

Q. TODD DICKINSON

Director of Patents and Trademarks